2,802,773

BASIC ALUMINUM CARBONATE AND GLYCINE COMPOSITION AND METHOD OF MAKING SAME

Stewart M. Beekman, Berkeley Heights, N. J., assignor to Reheis Company, Inc., a corporation of New York No Drawing. Application October 19, 1953, Serial No. 387,028

2 Claims. (Cl. 167—55)

This invention relates to an aluminum basic carbonate and glycine composition that is highly reactive with dilute acids and to the method of making the reactive composition.

The product of the invention is particularly useful as an antacid and will be illustrated by description in connection with such use.

In materials for neutralizing acid, such as the dilute hydrochloric of gastric acidity, there are several desiderata, as follows:

High rate of reaction with dilute acid.
Large acid neutralizing capacity
Low cost.

Since glycine is much higher in price than aluminum hydroxide, it is desirable, from the standpoint of cost of the finished composition, to use a low proportion of the glycine.

Krantz and Kibler faced these problems and described, in U. S. Patent 2,480,743, issued to them on August 30, 1949, means for making a reactive aluminum hydroxy glycinate or like salt of other alpha aminoacid. They found it necessary, in the first place, to use 1 mol of glycine for each atom of aluminum in the finished product. In addition, they used a slight excess of the glycine in the reaction. In a scientific paper, published by them in the Journal of Pharmacology and Experimental Therapeutics, vol. 82, No. 3 for November 1944, they state near the bottom of page 247 that they use such an excess as to correspond to 3 mols total of glycine to 1 atom of aluminum.

Furthermore, Krantz and Kibler state specifically in their patent that they cannot make their product from aluminum hydroxide gel but must start with an aluminum alcoholate which they then react with the excess of glycine.

We have now found a composition made from aluminum basic carbonate which requires only one-half mol of glycine or somewhat less to an atom of aluminum, which may be prepared from aluminum basic carbonate gel without the use of the alcoholate, which is highly reactive towards dilute acid, which has a high acid consuming capacity, and which, when made according to our method, may be dried without substantial loss of reactivity to dilute acids.

Briefly stated, our invention comprises the method of mixing reactive aluminum basic carbonate gel with glycine in proportion not in excess of one-half mol to 1 atom of aluminum in the gel and drying and then milling the resulting mixture when a dry powder is desired. The invention comprises also the herein described products containing the low proportion of glycine and having the desirable properties already stated.

When I mix this low proportion of glycine with the basic carbonate gel, I find that the glycine prevents loss of reactivity to dilute acids when the gel with which it is mixed is subsequently dried, as, for instance, by spray drying.

Data showing this effect of the glycine in protecting the aluminum basic carbonate against loss of reactivity towards dilute acid follows. In obtaining this data, there was used a reactive aluminum basic carbonate gel containing 11.9% of aluminum calculated as $Al_2O_3$, about 75% of water, and at least 2.6% of carbonate calculated as $CO_2$. It was prepared by the interaction of aluminum chloride and sodium carbonate, both in aqueous solution, the precipitate being separated by suction filtration and washed with water until free of soluble salts, this method giving a reactive form of aluminum basic carbonate gel. A portion of this reactive gel was dried in shallow layers on trays in heated air at a temperature of the air of about 45° C. and the dried material was then milled, for use in the reactivity test to be described. Another portion of the reactive gel was mixed with glycine in the proportion of ½ mol of glycine to 1 atom of aluminum. This glycine mixture was then dried and milled as before.

The times required for the end points, showing completion of reaction with a dilute acid to a certain stage, are shown for the two materials in the following table:

TABLE

| Material Tested | Reheis Method Time of Reaction, seconds |
|---|---|
| Aluminum basic carbonate dried without added glycine | 125 |
| Aluminum basic carbonate dried after adding glycine | 20 |

Corresponding times with the Mutch method of testing were 346 and 62 seconds, respectively, this method consistently giving higher times than the more rapid Reheis method.

It will be noted that the rate of reaction when the glycine was added before the drying is much higher than when the glycine is added after the drying. In fact, the times required for arrival at the end point of the test are only approximately one-sixth as long in each of the two methods with the glycine added before the drying as when the glycine is added after the drying is completed, that is, just before milling.

These reactivity tests are briefly as follows.

In the Reheis method aluminum compound (in this case the basic carbonate) equivalent to 0.50 g. of $Al_2O_3$ is added to 100 ml. of N/10 HCl at 37.5° C., with 2 drops of Toepfer's reagent as the end point indicator. The whole is shaken and maintained at 37.5° C. until the indicator changes color. The time required for this reaction is noted.

The Mutch test is similar to the Reheis test except that the Mutch test uses an amount of the aluminum compound equivalent to 0.1 g. $Al(OH)_3$ and 30 ml. of N/10 HCl.

In place of the glycine in making my finished composition, I may use other lower alpha-aminoacids, as, for example, those of acid hydrolyzed gelatin or any one of them represented in substantial proportion in the hydrolysate. I have not found any advantage, however, in the use of these substitutes for glycine.

As to proportions, I keep the proportion of the glycine low as stated. Actually, I may use and do use to advantage proportions ranging from ½ mol of glycine for an atom of aluminum in the aluminum basic carbonate gel down to ¼ mol or slightly less of the glycine.

The precipitating chemical used with the aluminum salt, in making the basic carbonate, is an alkali metal carbonate, examples of which are sodium and potassium carbonates and bicarbonates. Sodium carbonate is as satisfactory as any of the other materials and for reasons of economy is the carbonate preferred.

This reaction may be represented for one proportion of materials as follows:

$$8AlCl_3 + 12Na_2CO_3 + 10H_2O \rightarrow Al_8(OH)_{20}(CO_3)_2 + 24NaCl + 10CO_2$$

More specifically, the aluminum basic carbonate that I use contains carbonate (calculated as $CO_2$) in the proportion of 1 mol of the carbonate to 0.6–2.0 mols of alumina $Al_2O_3$ (2 atoms each of Al) in the product.

Also, the reactive aluminum basic carbonate, at the time of introduction of the glycine, includes at least approximately 70 parts of water in 100 parts of the aluminum basic carbonate gel, proportions here and elsewhere herein being expressed as parts by weight unless otherwise stated to the contrary.

The glycine is mixed to advantage with the wet aluminum basic carbonate gel at ordinary temperatures, a suitable mixer being a conventional slow speed turbine. There is no evidence of chemical reaction between the glycine and the gel.

The mixture so made is then dried, as on trays in a warm air stream or by spray drying technique.

The invention will be further illustrated by description in connection with the following specific examples of the practice of it.

*Example 1*

4,000 parts of aluminum basic carbonate gel, having an $Al_2O_3$ content of 10.0% and an acid reaction velocity measured by the Mutch method of less than 60 sec., are added to 1000 parts of water contained in a stainless steel tank provided with propeller type agitator. The whole is mixed thoroughly for about 10 min. To this thus diluted aluminum hydroxy carbonate gel, 294 parts of aminoacetic acid of good quality are added and the mixing continued for 5 minutes longer. The resulting mixture is then pumped to a spray drier employing a centrifugal atomizing mechanism and having an air inlet temperature of about 600° F. The dried product is received in a cyclone collector and is discharged into fiber drums. Slightly less than 1000 parts of product are thus obtained.

The resulting powder contains about 40% aluminum calculated as $Al_2O_3$ and 27% aminoacetic acid. The acid consuming capacity of the spray dried material is equivalent to 231 ml. N/10 hydrochloric acid per gram of powder and the rate of reaction with N/10 HCl was 11 sec. measured by the Reheis method and 55 sec. by the Mutch procedure. (For comparison the same batch of aluminum basic carbonate, spray dried under the same conditions as previously described but without the addition of aminoacetic acid, showed the reaction time toward N/10 hydrochloric acid of 230 sec. by the Reheis method. When aminoacetic acid was added to previously spray dried aluminum basic carbonate, the reaction time toward N/10 hydrochloric acid was materially increased, to 365 sec. by the Reheis method.)

*Example 2*

102 parts of aminoacetic acid were added to 2340 parts of reactive aluminum basic carbonate gel made by reaction of $AlCl_3$ and $Na_2CO_3$ solutions and containing 11.9% $Al_2O_3$. The two materials were mixed for 10 minutes in a paste mixer. The resulting mixture was spread out on plastic trays and placed in an air circulating oven for drying with an average temperature of 47° C. in the air for 67 hours. The dried mixture was ground through a high speed hammer mill using a herringbone screen of openings 0.035 inches in the shortest dimension. The resulting white powder had an aluminum content of 43.7% as $Al_2O_3$, an aminoacetic content 15.5%, and carbonate as $CO_2$ 10.9%. The total acid consuming capacity was 255 ml. of N/10 hydrochloric acid per gram and the reaction velocity toward N/10 hydrochloric acid was 32 sec. by the Reheis method and 196 sec. by the Mutch method. The step, recited above, of maintaining the gel and glycine composition under drying conditions, until the composition is dried, gives a product that is highly reactive as an antacid in neutralizing dilute acids.

The glycine materially increases the acid neutralizing rate of my dried basic aluminum carbonate gel. The glycine, however, is very largely removed by a single washing with a large volume of water.

It will be understood that it is intended to cover all changes and modifications of the examples of the invention herein chosen for the purpose of illustration which do not constitute departures from the spirit and scope of the invention.

What I claim is:

1. The method of making a dry aluminum basic carbonate and glycine composition which comprises forming a mixture of acid reactive aluminum basic carbonate gel in precipitated and undried condition, containing at least approximately 70% by weight of water and at least 0.5 mol of carbonate calculated as $CO_2$ for 1 atom of aluminum, and glycine in proportion not substantially greater than 0.5 mol to 1 atom of the said aluminum, subjecting the said mixture to an elevated temperature to cause drying, and continuing the drying until the product appears as a dried solid.

2. An antacid consisting essentially of the codried combination of aluminum basic carbonate and glycine, the composition containing, for each atom of aluminum, at least about 0.5 mol of carbonate calculated as $CO_2$ and not substantially more than 0.5 mol of glycine and being the product of the method of claim 1.

References Cited in the file of this patent

UNITED STATES PATENTS

| | | |
|---|---|---|
| 2,429,596 | Abramson | Oct. 28, 1947 |
| 2,480,743 | Krantz | Aug. 30, 1949 |

OTHER REFERENCES

Modern Drugs, April 1950, page 339.

"Dulcacid," Canadian Pharm. Journal, vol. 86, Apr. 15, 1953, page 14.

De Courcy Clinic, Staff Conferences, Bull. No. 26, June 15, 1954, page 7.